United States Patent
Yang et al.

(10) Patent No.: US 10,847,094 B2
(45) Date of Patent: Nov. 24, 2020

(54) GATE DRIVER, ORGANIC LIGHT EMITTING DISPLAY DEVICE AND DRIVING METHOD THEREOF

(71) Applicant: LG Display Co., Ltd., Seoul (KR)

(72) Inventors: JongWon Yang, Gyeonggi-do (KR); MyungJin Pyeon, Gyeonggi-do (KR)

(73) Assignee: LG DISPLAY CO., LTD, Seoul (KR)

(*) Notice: Subject to any disclaimer, the term of this patent is extended or adjusted under 35 U.S.C. 154(b) by 0 days.

(21) Appl. No.: 16/543,990

(22) Filed: Aug. 19, 2019

(65) Prior Publication Data
US 2020/0074931 A1 Mar. 5, 2020

(30) Foreign Application Priority Data
Aug. 29, 2018 (KR) .................. 10-2018-0101931

(51) Int. Cl.
  *G09G 3/3258* (2016.01)
  *G09G 3/3291* (2016.01)
  *G06F 1/04* (2006.01)

(52) U.S. Cl.
  CPC ............ *G09G 3/3258* (2013.01); *G06F 1/04* (2013.01); *G09G 3/3291* (2013.01); *G09G 2310/0289* (2013.01)

(58) Field of Classification Search
  CPC ............... G09G 3/3258; G09G 3/3291; G09G 2310/0289; G09G 3/3233; G09G 2310/08; G09G 3/3266; G09G 3/3208; G06F 1/04
  See application file for complete search history.

(56) References Cited

U.S. PATENT DOCUMENTS

2014/0253531 A1   9/2014   Lee et al.
2018/0033373 A1   2/2018   Hong et al.

FOREIGN PATENT DOCUMENTS

| JP | 2006-284716 A | 10/2016 | |
|----|---|---|---|
| KR | 1020120041570 A | 5/2012 | |
| KR | 1020140038240  * | 3/2014 | ............... G09G 3/36 |
| KR | 1020140038240 A | 3/2014 | |
| KR | 1020170053204 A | 5/2017 | |

OTHER PUBLICATIONS

European Search Report dated Nov. 6, 2019 issued in a corresponding European Patent Application No. 19193638.4 (9 pages).
Notice of Reason for Refusal dated Aug. 31, 2020 issued in Japanese Patent Application No. 2019-149705 w/English Translation (8 pages).

* cited by examiner

*Primary Examiner* — Christopher J Kohlman
(74) *Attorney, Agent, or Firm* — Polsinelli PC

(57) ABSTRACT

A gate driver for an organic light emitting display device comprises a selector configured to select and output one of a first low voltage and a second low voltage in response to a mode selection signal, wherein the first low voltage is selected in a first mode and the second low voltage is selected in a second mode, and the second low voltage has a lower level than the first low voltage, and a level shifter configured to generate a clock signal based on a high voltage and the first low voltage, to output the clock signal at a first output terminal, and to generate a direct current signal corresponding to the first or second low voltage outputted from the selector and to output the direct current signal at a second output terminal, wherein the high voltage is a voltage level higher than the first low voltage and the clock signal is a voltage level between the high voltage and the first low voltage.

20 Claims, 12 Drawing Sheets

GATE DRIVER, ORGANIC LIGHT EMITTING DISPLAY DEVICE AND DRIVING METHOD THEREOF

CROSS-REFERENCE TO RELATED APPLICATION

This application claims the priority benefit of Korean Patent Application No. 10-2018-0101931, filed on Aug. 29, 2018, which is hereby incorporated by reference in its entirety.

BACKGROUND

Field of the Disclosure

The present disclosure relates to gate drivers, organic light emitting display devices including the same and methods of driving the gate drivers and organic light emitting display devices.

Description of the Background

As the information society has developed at a rapid rate, there is an increasing need for display devices employing advanced technologies and more efficient methods. Recently, various types of flat display devices, such as a liquid crystal display (LCD) device, a plasma display panel (PDP) device, an organic light emitting display (OLED) device, or the like, have been developed and utilized.

Among the flat display devices, the organic light emitting display device has advantageous to a thinner display device, and has better viewing angles, a higher contrast ratio and the like. Accordingly, the organic light emitting display device has been widely used in various types of devices. The organic light emitting display device emits light and displays images by supplying driving currents to one or more organic light emitting diodes capable of directly illuminating each pixel. However, the light emitting performance of the organic light emitting diode may not remain constant indefinitely. As the organic light emitting diode ages over time and use, it may be degraded, and when displaying still images with a high luminance, it may be further degraded. The organic light emitting diode may have a problem that an undesired after-image can be perceived due to the degradation; therefore, its lifetime can be shortened.

Furthermore, threshold voltages of driving transistors supplying driving voltages to the organic light emitting diode may change due to process variations; as a result, there is a possibility that a difference in driving currents between subpixels occurs. When a difference in the driving currents occurs, the luminance of the organic light emitting diodes may not be uniform across the display; therefore, there is a possibility that the quality of displayed images reduces. When the organic light emitting diode is degraded, there is a possibility that it emits light at luminance lower than a gray scale voltage.

Accordingly, in order to prevent display quality from being reduced, the organic light emitting device can be operated in a sensing mode for sensing characteristics of a display panel and in a display mode for revising data signals based on sensed results, and displaying images using the revised data signals.

Furthermore, in the case of an active matrix type of organic light emitting display device, data signals can be applied to subpixels in response to gate signals; therefore, light corresponding to the data signals can be emitted from the subpixels. However, in the case of organic light emitting display devices with a large area and a higher resolution, resistance-capacitance (RC) delay may increase; therefore a gate signal may be delayed. The delay of the gate signal may result in a data signal corresponding to an intended subpixel being applied to a data signal corresponding to another subpixel; therefore, there is a possibility that the quality of displayed images may reduce.

SUMMARY

Accordingly, the present disclosure is directed to gate drivers, organic light emitting display devices and methods of driving the gate drivers and the organic light emitting display devices that substantially obviate one or more problems due to limitations and disadvantages of the prior art.

The present disclosure provides gate drivers and organic light emitting display devices capable of preventing display quality from being reduced, and methods of driving the gate drivers and the organic light emitting display devices.

The present disclosure provides gate drivers and organic light emitting display devices capable of preventing a gate signal from being delayed due to RC delay, and methods of driving the gate drivers and the organic light emitting display devices.

The present disclosure provides gate drivers and organic light emitting display devices with a large area and a higher resolution, and methods of driving the gate drivers and the organic light emitting display devices.

In accordance with one aspect of the present disclosure, a gate driver, in particular for an organic light emitting display device, includes: a selector receiving a first low voltage and a second low voltage with a lower level than the first low voltage, and selecting and outputting one of the first low voltage and the second low voltage such that in response to a mode selection signal, the first low voltage is selected in a first mode and the second low voltage is selected in a second mode, and a level shifter including a first output terminal receiving a high voltage and the first low voltage, and outputting a clock signal with a voltage level between the high voltage and the first low voltage, and a second output terminal outputting a direct current (DC) signal corresponding to the first low voltage or the second low voltage selected in the selector.

In accordance with one aspect of the present disclosure, a gate driver, in particular for an organic light emitting display device, includes: a selector connected to a power supplier for receiving a first low voltage and a second low voltage with a lower level than the first low voltage therefrom, the selector being configured to select and output one of the first low voltage and the second low voltage in response to a mode selection signal, such that the first low voltage is selected in a first mode and the second low voltage is selected in a second mode, and a level shifter being connected to the selector and to the power supplier for receiving a high voltage and the first low voltage, the level shifter being configured to generate a clock signal with a voltage level between the high voltage and the first low voltage, and a direct current (DC) signal corresponding to the first or second low voltage depending on the selection by the selector. The level shifter may be connected to the selector in order to receive the selected one of the first or second low voltage. The first mode may be referred to as a sensing mode, the second mode may be referred to as a displaying mode.

The gate driver may further comprise a gate signal generating circuit receiving the clock signal and the direct current signal and outputting a gate signal such that in the first mode, a voltage level of the gate signal repeats the high voltage and the first low voltage, and in the second mode, the voltage level of the gate signal is changed in the order of the high voltage, the second low voltage, the first low voltage and the high voltage.

The level shifter may further comprise a control logic; a clock signal generator controlled by the control logic and outputting the clock signal using the high voltage and the first low voltage; and a control signal generator controlled by the control logic and controlling the gate signal generating circuit.

The gate driver may further comprise a timing controller outputting a sensing signal in the first mode and outputting an image signal in the second mode. The mode selection signal may be received from the timing controller.

In accordance with another aspect of the present disclosure, an organic light emitting device is provided that includes a gate driver according to any one of the herein described aspects. Thus, the organic light emitting device may include: a display panel on which a plurality of data lines and a plurality of gate lines intersect, and which includes a plurality of subpixels defined in areas in which the plurality of data lines and the plurality of gate lines intersect, a data driver applying one or more data signals or sensing signals to the data lines, a gate driver applying one or more gate signals to the gate lines, a timing controller controlling the data deliver and the gate driver, a selector receiving a first low voltage and a second low voltage with a lower level than the first low voltage, and selecting and outputting one of the first low voltage and the second low voltage such that in response to a mode selection signal, the first low voltage is selected in a first mode and the second low voltage is selected in a second mode, and a level shifter including a first output terminal receiving a high voltage and the first low voltage, and outputting a clock signal with a voltage level between the high voltage and the first low voltage, and a second output terminal outputting a direct current (DC) signal corresponding to the first low voltage or the second low voltage selected in the selector.

The gate driver may further comprise a gate signal generating circuit receiving the clock signal and the direct current signal and outputting a gate signal such that in the first mode, a voltage level of the gate signal repeats the high voltage and the first low voltage, and in the second mode, the voltage level of the gate signal is changed in the order of the high voltage, the second low voltage, the first low voltage and the high voltage.

The gate signal generating circuit may be disposed on the display panel and connected to the plurality of gate lines.

The level shifter may further comprise a control logic; a clock signal generator controlled by the control logic and outputting the clock signal using the high voltage and the first low voltage; and a control signal generator controlled by the control logic and controlling the gate signal generating circuit.

The timing controller may be configured to cause the data driver to output at least one sensing voltage corresponding to the at least one sensing signal to at least one data line of the plurality of data lines, in the first mode. The timing controller may be configured to cause the data driver to output at least one data voltage corresponding to the at least one data signal to the at least one data line, in the second mode.

Each of the plurality of subpixels may comprise a first transistor including a first electrode connected to a first node connected to a first power supply line for delivering a high pixel voltage, a gate electrode connected to a second node, and a second electrode connected to a third node; a second transistor including a first electrode connected to at least one data line of the plurality of data lines, a gate electrode connected to at least one gate line of the plurality of gate lines, and a second electrode connected to the second node; a third transistor including a first electrode connected to the third node, a gate electrode connected to a sensing signal line, and a second electrode connected to a second power supply line for delivering a reference voltage; a capacitor connected between the first node and the third node; and an organic light emitting diode including a first electrode connected to the third node and a second electrode connected to a low voltage.

The organic light emitting display device may further comprise a current sensor sensing a current flowing through the third node and outputting information according to a characteristic value of at least one subpixel of the plurality of subpixels.

The current sensor may include an integrator comparing a sensing voltage generated by the current flowing through the third node with a pre-set reference voltage, and outputting the information according to the characteristic value of the at least one subpixel.

The first mode and the second mode may be repeated alternately.

The first mode may be performed when the display panel starts to operate.

In accordance with further another aspect of the present disclosure, a method of driving an organic light emitting device is provided that includes: providing a sensing voltage to a subpixel in response to a gate signal in a first mode, and providing a data voltage to the subpixel in response to the gate signal in a second mode. Here, in the first mode, a voltage level of the gate signal is changed in the order of a first low voltage, a high voltage, a second low voltage, and the first low voltage, and in the second mode, the voltage level of the gate signal repeats the first low voltage and the high voltage.

The method may further comprise: receiving a pulse signal or clock signal with a voltage level between the high voltage and the first low voltage, and a direct current signal corresponding to a voltage level of the second low voltage, and outputting a gate signal, in the first mode.

The method may further comprise receiving a pulse signal or clock signal with a voltage level between the high voltage and the first low voltage, and a direct current signal corresponding to a voltage level of the first low voltage, and outputting a gate signal, in the second mode.

According to another aspect, a method for controlling a gate driver for an organic light emitting display device or for controlling a light emitting display device having a gate driver may include receiving, e.g. by a selector, a first low voltage and a second low voltage with a lower level than the first low voltage, and selecting and outputting one of the first low voltage and the second low voltage such that in response to a mode selection signal, the first low voltage is selected in a first mode and the second low voltage is selected in a second mode, and receiving, e.g. by a first output terminal of a level shifter, a high voltage and the first low voltage, and outputting a clock signal with a voltage level between the high voltage and the first low voltage, and outputting, e.g. by a second output terminal of the level shifter, a direct current (DC) signal corresponding to the selected one of the first low voltage or the second low voltage. The mode selection signal may be provided by a timing controller.

The method may further comprise in response to receiving the clock signal and the direct current signal, outputting a gate signal such that in the first mode, a voltage level of the gate signal repeats the high voltage and the first low voltage, and in the second mode, the voltage level of the gate signal is changed in the order of the high voltage, the second low voltage, the first low voltage and the high voltage.

The method may further comprise outputting a sensing signal in the first mode and outputting an image signal in the second mode, e.g. by the timing controller.

The method may further comprise outputting at least one sensing voltage corresponding to the at least one sensing signal to at least one data line of a plurality of data lines of the organic light emitting display device, in the first mode, and outputting at least one data voltage corresponding to the at least one data signal to the at least one data line, in the second mode.

The method may further comprise sensing a current flowing through a predetermined node of one of a plurality of subpixels of the organic light emitting device and outputting information according to a characteristic value of said subpixel. The method may further comprise comparing a sensing voltage generated by the current flowing through the predetermined node with a pre-set reference voltage, e.g. before outputting the information according to the characteristic value.

The first mode and the second mode may be repeated alternately. The first mode may be performed when the organic light emitting display device or a display panel thereof starts to operate.

In accordance with aspects of the present disclosure, it is possible to provide an organic light emitting display device capable of improving the quality of displayed images, and a method of driving the organic light emitting display device.

In accordance with aspects of the present disclosure, it is possible to provide an organic light emitting display device capable of preventing a gate signal from being delayed due to RC delay, and a method of driving the organic light emitting display device.

In accordance with aspects of the present disclosure, it is possible to provide an organic light emitting display device with a large area and a high resolution, and a method of driving the organic light emitting display device.

Additional features and advantages of the disclosure will be set forth in the description which follows and in part will be apparent from the description, or may be learned by practice of the disclosure. The objectives and other advantages of the disclosure will be realized and attained by the structure particularly pointed out in the written description and claims hereof as well as the appended drawings.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Figure 1:
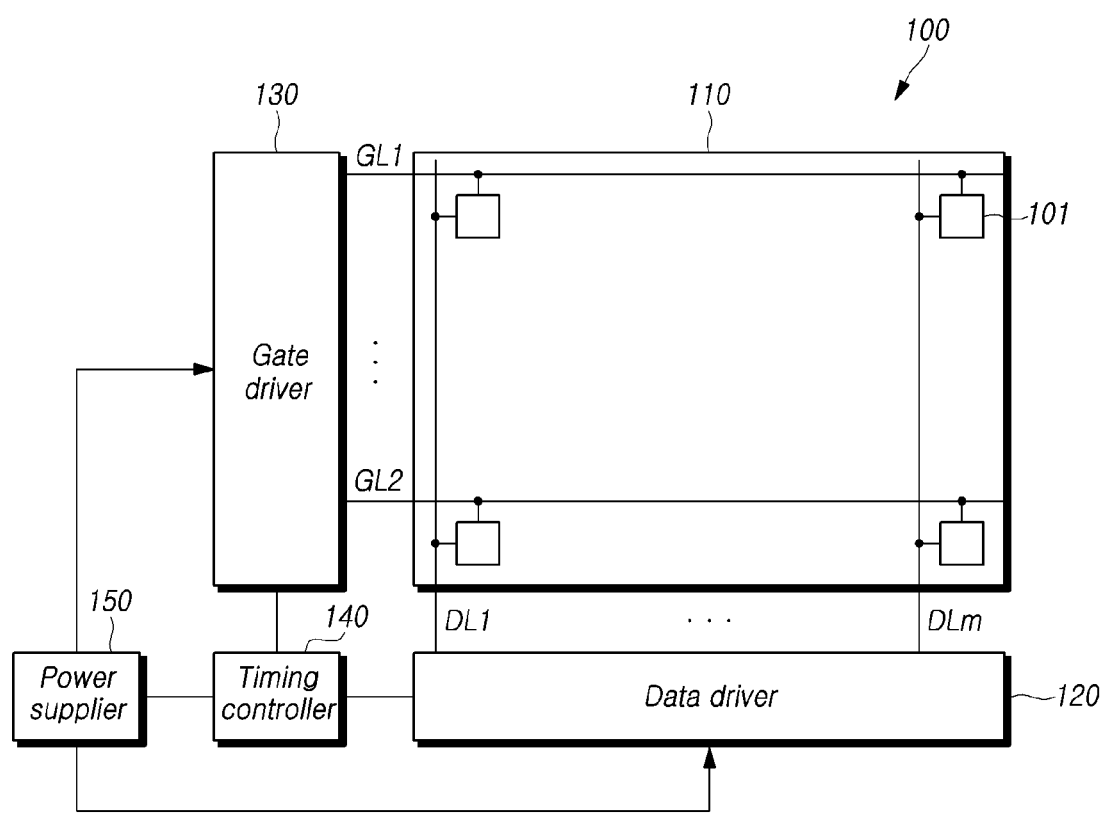
FIG. 1 is a view schematically illustrating an organic light emitting display device according to the present disclosure.

Hereinafter, the aspects of the present disclosure will be described in detail with reference to the accompanying drawings. In denoting elements of the drawings by reference numerals, the same elements will be referenced by the same reference numerals although the elements are illustrated in different drawings. In the following description of the disclosure, detailed description of known functions and configurations incorporated herein may be omitted when it may make the subject matter of the disclosure rather unclear.

Terms, such as first, second, A, B, (A), or (B) may be used herein to describe elements of the disclosure. Each of the terms is not used to define essence, order, sequence, or number of an element, but is used merely to distinguish the corresponding element from another element. When it is mentioned that an element is "connected" or "coupled" to another element, it should be interpreted that another element may be "interposed" between the elements or the elements may be "connected" or "coupled" to each other via another element as well as that one element is directly connected or coupled to another element.

FIG. 1 is a view schematically illustrating an organic light emitting display device according to the present disclosure.

Referring to FIG. 1, the organic light emitting display device can include a display panel 110, a gate driver 120, a data driver 130, a timing controller 140, and a power supplier 150.

The display panel 110 can include a plurality of gate lines (GL1, . . . , GLn) and a plurality of data lines (DL1, . . . , DLm), which intersect each other on the display panel 110 at a predetermined angle. The display panel 110 can include a plurality of subpixels 101 arranged to correspond to areas in which the plurality of gate lines (GL1, . . . , GLn) and the plurality of data lines (DL1, . . . , DLm) intersect each other. The plurality of subpixels can include at least one organic light emitting diode and a pixel circuit supplying a driving current to the at least one organic light emitting diode. The pixel circuit is connected to the plurality of gate lines (GL1, . . . , GLn) and the plurality of data lines (DL1, . . . , DLm), and can supply the driving current to the at least one organic light emitting diode. Here, in FIG. 1, the plurality of gate lines (GL1, ..., GLn) and the plurality of data lines (DL1, ..., DLm) are arranged in the display panel 110. However, aspects of the present disclosure are not limited thereto and other arrangements are possible.

The data driver 120 can apply one or more data voltages Vdata corresponding to one or more data signals to the plurality of data lines (DL1, ..., DLm). The data voltage may correspond to gray scale. The data driver 120 can apply one or more sensing voltages Sdata corresponding to one or more sensing signals to the plurality of data lines (DL1, ..., DLm). The sensing voltage may be lower than a threshold voltage of the organic light emitting diode. When the sensing voltage is lower than a threshold voltage of the organic light emitting diode, the organic light emitting diode may not emit light. In this situation, even when the sensing signal is delivered, there is a possibility that a corresponding image may not be displayed on the display panel 110. Further, the sensing signal may have a gray scale voltage corresponding to black. It is noted that a single data driver 120 is illustrated in FIG. 1, but aspects of the present disclosure are not limited thereto. The number of data drivers may be determined according to the size or resolution of the display panel 110. For example, two or more data drivers may be employed. In addition, the data driver 120 may be implemented as an integrated circuit.

The gate driver 130 can apply one or more gate signals to the gate lines (GL1, ..., DLm). One or more pixels 101 corresponding to the gate lines (GL1, ..., GLn) to which one or more gate signals are applied can receive one or more data signals. Further, the gate driver 130 can transfer a sensing control signal to one or more subpixels 101. The subpixel 101 received the sensing control signal outputted from the gate driver 130 can receive a sensing voltage outputted from the data driver 120. It is noted that a single gate driver 130 is illustrated in FIG. 1, but aspects of the present disclosure are not limited thereto. The number of data drivers may be determined according to the size or resolution of the display panel 110. For example, two or more gate drivers may be employed. Further, the gate driver 130 can include two gate drivers disposed on both sides of the display panel 110, and one can be connected to one or more odd numbered gate lines of the plurality of gate lines (GL1, ..., GLn) and the other can be connected to one or more even numbered gate lines of the plurality of gate lines (GL1, ..., GLn). However, aspects of the present disclosure are not limited thereto, and other configurations are possible. The gate driver 130 may be implemented as an integrated circuit.

The timing controller 140 can control the data driver 120 and the gate driver 130. Further, the timing controller 140 can transfer a data signal and a sensing signal to the data driver 120. The data signal and the sensing signal may be digital signals. Further, the timing controller 140 can revise a data signal and transfer the revised signal to the data driver 120. Herein, operations of the timing controller 140 are not limited thereto, and other various operations or controlling are possible. The timing controller 140 may be implemented as an integrated circuit. Further, the timing controller 140 can revise a data signal in response to a sensing signal and transfer the revised signal to the data driver 120.

A power supplier 150 can supply driving voltages of the data driver 120, the gate driver 130, and the timing controller 140. In addition, the power supplier 150 can supply a driving voltage of the display panel 150. The power supplier 150 may be a power management integrated circuit (PMIC) 150. However, aspects of the present disclosure are not limited thereto, and other configurations are possible.

Figure 2:
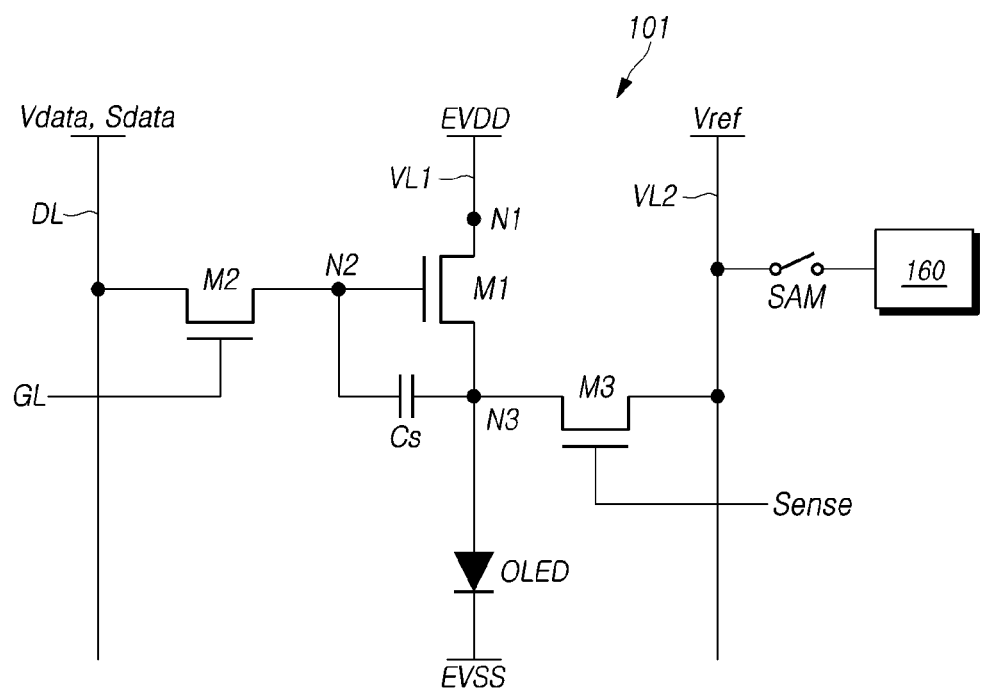
FIG. 2 is a circuit diagram illustrating the subpixel illustrated in FIG. 1 according to the present disclosure.

FIG. 2 is a circuit diagram illustrating the subpixel illustrated in FIG. 1 according to the present disclosure.

Referring to FIG. 2, the subpixel 101 can include an organic light emitting diode (OLED) and a pixel circuit for driving the organic light emitting diode (OLED). The pixel circuit can include a first transistor M1, a second transistor M2, a third transistor M3, and a capacitor CS.

A first electrode of the first transistor M1 can be connected to a first node N1 connected to a first power supply line VL1 for delivering a pixel high voltage EVDD. The gate electrode of the first transistor M1 can be connected to a second node N2, and a second electrode thereof can be connected to a third node N3. The first transistor M1 enables a current to flow from the first node N1 to the third node N3 in response to a voltage delivered to the second node N2. The first electrode and the second electrode of the first transistor M1 may be a drain electrode and a source electrode, respectively. However, aspects of the present disclosure are not limited thereto, and other configurations are possible.

The current flowing from the first node N1 to the third node N3 may correspond to Equation 1 as follows.

$$Id = k(V_{GS} - Vth)^2 \quad \text{[Equation 1]}$$

Here, the Id denotes an amount of current flowing from the first node N1 to the third node N3, the k denotes electron mobility of the transistor, the VGS denotes a difference in voltages between the gate electrode and the source electrode of the first transistor M1, and the Vth denotes a threshold voltage of the first transistor M1.

Accordingly, since an amount of current varies depending on a deviation in the electron mobility and the threshold voltage; it is therefore possible to prevent the quality of displayed images from being reduced by revising a corresponding data signal in response to the deviation in the electron mobility and the threshold voltage.

The gate electrode of the second transistor M2 can be connected to a gate line GL, and first and second electrodes thereof can be connected to a data line DL and the second node N2, respectively. Accordingly, the second transistor M2 enables a data voltage Vdata corresponding to the data signal to be delivered to the second node N2 in response to the gate signal delivered through the gate line GL. The first electrode and the second electrode of the second transistor M2 may be a drain electrode and a source electrode, respectively. However, aspects of the present disclosure are not limited thereto, and other configurations are possible.

The gate electrode of the third transistor M3 can be connected to a sensing control signal line (Sense), and first and second electrodes thereof can be connected to the third node N3 and a second power supply line VL2 for delivering a reference voltage Vref, respectively. The reference voltage Vref can reset a voltage in the third node N3. In addition, a voltage applied to the third node N3 may include information corresponding to a characteristic value of the subpixel 101. Accordingly, a data signal may be compensated according to the characteristic value of the subpixel through the voltage applied to the third node N3. In addition, a current flowing through the third node N3 may include information corresponding to the characteristic value of the subpixel 101. In this situation, the third transistor M3 connected to the third node N3 is connected to a current sensor; therefore, in the current sensor, a current flowing through the third node N3 can be sensed, and the characteristic value of the subpixel 101 can be detected. The characteristic value of the subpixel 101 may be a threshold voltage or electron mobility of the first transistor M1, or degradation information of the organic light emitting diode (OLED). However, aspects of the present disclosure are not limited thereto, and other characteristic values are possible. The first electrode and the second electrode of the third transistor M3 may be a drain electrode and a source electrode, respectively. However, aspects of the present disclosure are not limited thereto, and other configurations are possible.

The capacitor CS can be connected between the second node N2 and the third node N3. The capacitor CS may constantly maintain voltages in the gate electrode and the source electrode of the first transistor M1.

The anode electrode and the cathode electrode of the organic light emitting diode (OLED) can be connected to the third node N3 and a pixel low voltage EVSS, respectively. Here, the pixel low voltage EVSS may be a ground voltage. However, aspects of the present disclosure are not limited thereto, and other voltages are possible. When current flows from the anode electrode to the cathode electrode, the organic light emitting diode (OLED) can emit light depending on an amount of the current. The organic light emitting diode (OLED) can emit light of any one of red, green, blue, and white. However, aspects of the present disclosure are not limited thereto, and emitting light of other colors is possible.

A subpixel to be employed in the organic light emitting display device 100 is not limited to the subpixel 101 described above.

Figure 3:
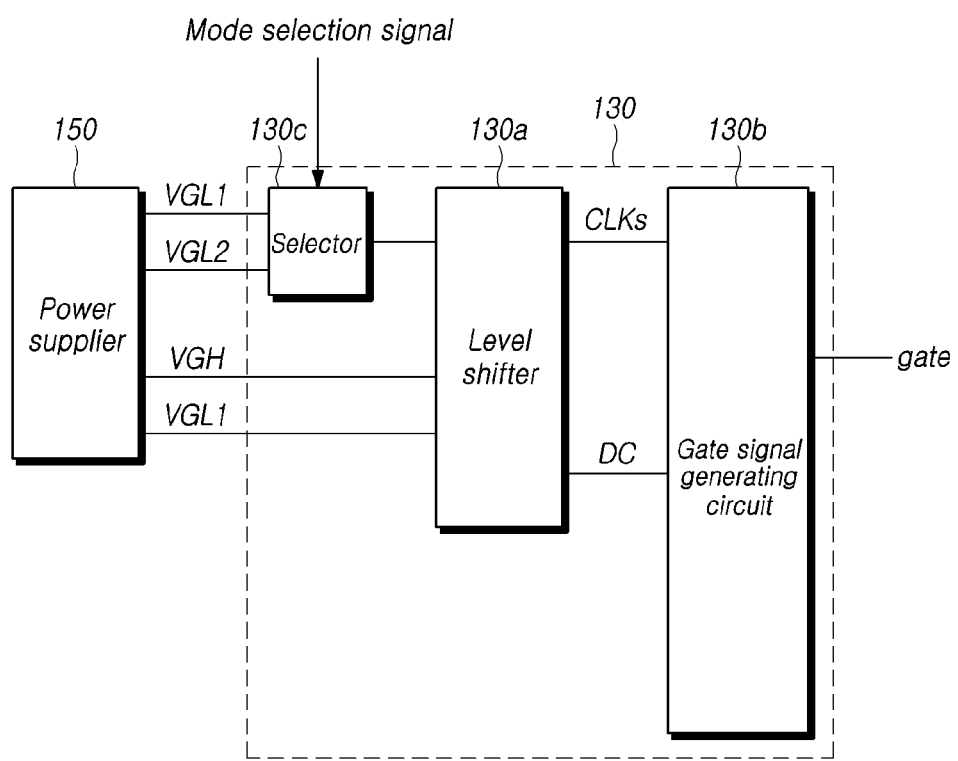
FIG. 3 is a diagram illustrating a relationship between the gate driver and the power supplier illustrated in FIG. 1 according to the present disclosure.

FIG. 3 is a diagram illustrating a relationship between the gate driver and the power supplier illustrated in FIG. 1 according to the present disclosure.

Referring to FIG. 3, the gate driver 130 can operate by a power from the power supplier 150. The gate driver 130 can include a selector 130c and a level shifter 130a.

The selector 130c can receive a first low voltage VGL1 and a second low voltage VGL2 with a lower level than the first low voltage VGL1, and select and output one of the first low voltage VGL1 and the second low voltage VGL2 such that in response to a mode selection signal, the first low voltage is selected in a first mode and the second low voltage is selected in a second mode. The selector 130c may be a multiplexer. The selector 130c can receive the mode selection signal from the timing controller 140. The timing controller 140 can cause the data driver 120 to output a sensing signal to the subpixel 101 in the first mode, and cause the data driver 120 to output a data signal to the subpixel 101 in the second mode. The first mode may be a mode for sensing a characteristic value of the subpixel 101, and the sensing mode may be a mode for driving the subpixel 101 and displaying images on the display panel. The timing controller 140 shown in FIG. 1 can cause the data driver 120 to output a sensing voltage corresponding to the sensing signal to a data line in the first mode, and cause the data driver 120 a data voltage corresponding to the data signal to the data line in the second mode.

The level shifter 130a can include a first output terminal receiving a high voltage VGH and the first low voltage VGL1, and outputting a clock signal CLKs with a voltage level between the high voltage VGH and the first low voltage VGL1, and a second output terminal outputting a direct current (DC) signal corresponding to the first low voltage VGL1 or the second low voltage VGL2 selected in the selector 130c. Here, FIG. 3 shows that the high voltage VGH, the first low voltage VGL1 and/or the second low voltage VGL2 are applied to the level shifter 130a; however, signals and voltages applied to the level shifter 130a are not limited thereto. For example, one or more other signals and voltages can be applied to the level shifter 130a.

The gate driver 130 can include a gate signal generating circuit 130b outputting a gate signal (gate). The gate signal generating circuit 130b can receive the clock signal CLKs and the direct current (DC) signal and output the gate signal (gate). Here, in the first mode, a voltage level of the gate signal (gate) is changed in the order of the high voltage VGH, the second low voltage VGL2, the first low voltage VGL1, and the high voltage VGH, and in the second mode, the voltage level of the gate signal (gate) repeats the high voltage VGH and the first low voltage VGL1.

The gate signal generating circuit 130b can output the gate signal (gate) using the clock signal repeating a high state and a low state such that a voltage level in the low state in a falling interval of the clock signal CLKs corresponds to a voltage of the direct current (DC) signal. That is, when the voltage level of the direct current (DC) signal corresponds to the first low voltage VGL1, the voltage level in the high state of the gate signal (gate) can be the high voltage VGH, and the voltage level in the low state thereof can be the first low voltage VGL1. Further, when the voltage level of the direct current (DC) signal corresponds to the second low voltage VGL2, the voltage level in the high state of the gate signal (gate) can be the high voltage VGH, and the low state of the gate signal (gate) can include the first low voltage VGL1 and the second low voltage VGL2 such that the gate signal (gate) first becomes the second low voltage VGL2 for a certain time in the falling interval and thereafter, becomes the first low voltage VGL1 by the rising of the voltage level.

The gate driver 130 can receive the high voltage VGH, the first low voltage VGL1, and the second low voltage VGL2 from the power supplier 150. The power supplier 150 can generate the high voltage VGH and the first low voltage VGL1 and transfer these to the level shifter 130a. Further, the power supplier 150 can transfer the second low voltage VGL2 different from the first low voltage VGL1 to the selector 130c. However, aspects of the present disclosure are not limited thereto, and other configurations are possible.

Figure 4:
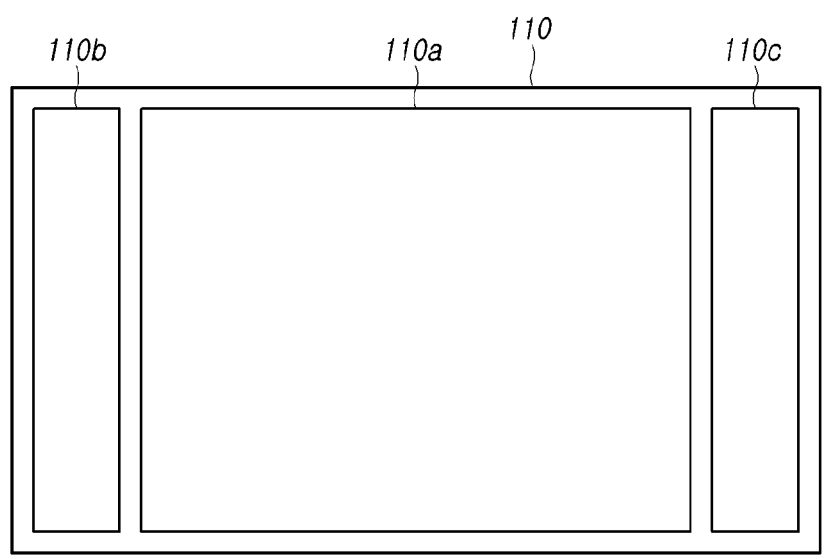
FIG. 4 is a diagram illustrating the display panel illustrated in FIG. 1 according to the present disclosure.

FIG. 4 is a diagram illustrating the display panel illustrated in FIG. 1 according to the present disclosure.

Referring to FIG. 4, the display panel 110 can include a display area 110a and one or more non-display areas 110b and 110c. The non-display area can be disposed in both sides 110b, 110c of the display area 110a, such as left and right sides or top and bottom sides. However, aspects of the present disclosure are not limited thereto, and the non-display area can be disposed in other one or more areas. The gate signal generating circuit 130b shown in FIG. 3 can be disposed in the non-display area 110b or 110c. Accordingly, the gate signal generating circuit 130b can be formed in conjunction with the display panel 110; therefore, a related manufacturing process can be simplified.

Figure 5A:
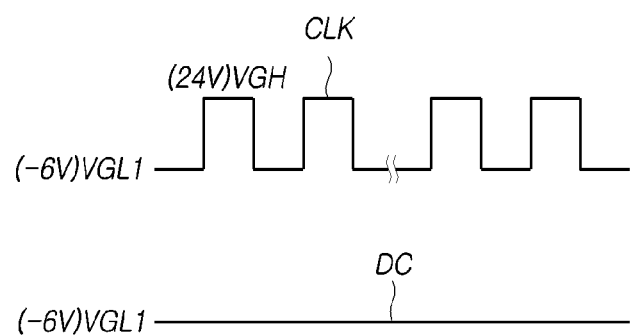
FIG. 5A illustrates a waveform of a signal outputted from a level shifter in a first mode according to the present disclosure.

FIG. 5A illustrates a waveform of a signal outputted from the level shifter in the first mode according to the present disclosure, i.e. a sensing mode.

Referring to FIG. 5A, the level shifter 130a can receive a high voltage VGH and a first low voltage VGL1 and output a clock signal CLK. The clock signal CLK outputted from the level shifter 130a may have a voltage level between the high voltage VGH and the first low voltage VGL1. Voltage levels of the high voltage VGH and the first low voltage VGL1 may be 24V and (−)6V, respectively. However, aspects of the present disclosure are not limited thereto, and different voltage values are possible. In addition, the level shifter 130a can output a direct current (DC) signal. A voltage level of the direct current (DC) signal may be the first low voltage VGL1 selected in the selector 130c.

Figure 5B:
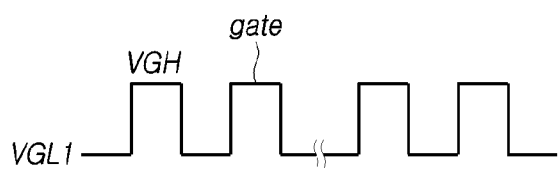
FIG. 5B illustrates a waveform of a gate signal outputted from a gate signal generating circuit in the first mode according to the present disclosure.

FIG. 5B illustrates a waveform of a gate signal outputted from the gate signal generating circuit in the first mode according to the present disclosure.

Referring to FIG. 5B, the first mode may be a mode for sensing a characteristic value of the subpixel 101.

In the first mode, the gate signal generating circuit 130b can generate a gate signal using a high voltage VGH and a first low voltage VGL1 received from the level shifter 130a. The gate signal (gate) has a voltage of a direct current (DC) signal in a falling interval, and since the voltage of the direct current (DC) signal has the voltage level of the first low voltage VGL1, the gate signal (gate) repeats the high voltage VGH level and the first low voltage VGL1 level. When sensing a characteristic value of the subpixel 101 using current sensing in the sensing mode, since a capacitance formed inside of the data driver 120 is used, it is sensitive to a noise outside thereof. The sensing signal becomes coupled to a voltage level of the gate signal (gate); therefore a sensing noise may occur. In this situation, when the voltage level of the gate signal (gate) falls to the voltage level of the second low voltage VGL2 and then rises and reaches the voltage level of the first low voltage VGL1, it may be considered as a noise; thus related sensing data may be different from desired data. However, when the voltage level of the gate signal (gate) repeats the voltage level of the high voltage VGH and the voltage level of the low voltage VGL1, it is possible to prevent the sensing data from being different from desired data due to the noise.

Figure 6A:
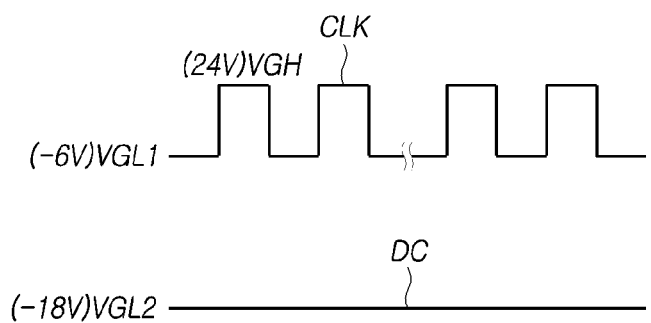
FIG. 6A illustrates a waveform of a signal outputted from the level shifter in a second mode according to the present disclosure.

FIG. 6A illustrates a waveform of a signal outputted from the level shifter in the second mode according to the present disclosure, i.e. a display mode.

Referring to FIG. 6A, the level shifter 130a can receive a high voltage VGH and a first low voltage VGL1 and output a clock signal CLK. The clock signal CLK outputted from the level shifter 130a may have a voltage level between the high voltage VGH and the first low voltage VGL1. In addition, the level shifter 130a can output a direct current (DC) signal. A voltage level of the direct current (DC) signal may be a second low voltage VGL2 selected in the selector 130c. Voltage levels of the high voltage VGH, the first low voltage VGL1, and the second low voltage VGL2 may be 24V, (−)6V, and (−)18V, respectively. However, aspects of the present disclosure are not limited thereto, and different voltage values are possible.

Figure 6B:
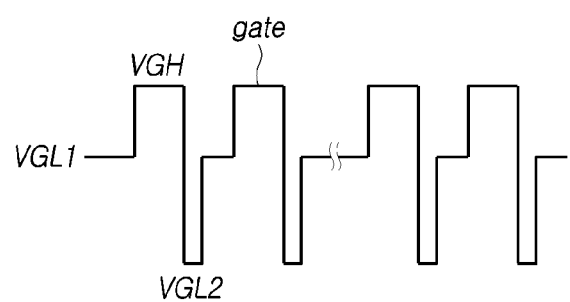
FIG. 6B illustrates a waveform of a gate signal outputted from the gate signal generating circuit in the second mode according to the present disclosure.

FIG. 6B illustrates a waveform of a gate signal outputted from the gate signal generating circuit in the second mode according to the present disclosure.

Referring to FIG. 6B, the second mode may be a display mode for displaying images through light-emitting of the subpixel 101.

In the second mode, the gate signal generating circuit 130b can generate a gate signal (gate) using a high voltage VGH, a first low voltage VGL1, and a second low voltage VGL2 received from the level shifter 130a. The gate signal (gate) falls up to the direct current (DC) signal in a falling interval where the voltage falls. Since the voltage of the direct current (DC) signal has the voltage level of the second low voltage VGL2, the gate signal (gate) falls from the high voltage VGH level up to the second low voltage VGL2 level in the falling interval, and thereafter, rises and reaches the first low voltage VGL1. That is, in the second mode, current is required to flow through the organic light emitting diode (OLED), rather than performing current sensing; therefore, a situation in the second mode is less affected by external noises than that in the first mode.

Here, the display panel 110 causes a data voltage corresponding to a data signal to be applied to the subpixel 101 in a turn-on interval of the gate signal (gate); therefore, causes light corresponding to a data signal to emit from each subpixel 101 and a corresponding image to be displayed. In the case of the display panel 110 with a large area and a high resolution, RC delay can increase; therefore, the entering of the gate signal (gate) into a turn-off interval can be delayed. When the turn-off of the gate signal (gate) is delayed, there is a possibility that data signals are mismatched to intended subpixels 101. To solve or address such a problem, by reducing the falling interval of the gate signal (gate) and allowing the gate signal (gate) to enter rapidly the turn-off interval, it is possible to prevent data signals from being mismatched to intended subpixels 101. In the falling interval, the greater a difference in voltages in the high and low states is, the shorter the falling interval becomes; therefore, the gate signal (gate) can enter the turn-off interval rapidly. Furthermore, it is possible to prevent power consumption from being increased by not allowing a voltage in the high state to be a certain high level. Summarizing, in the second mode, the display process is less sensitive to noise, but an RC delay should be prevented. Therefore, a gate signal having three levels is used in order to increase the difference between the highest voltage level and the lowest voltage level, and thus to rapidly change between the two voltage levels. In contrast, in the first mode, the sensing process is very sensitive to noise, so that a gate signal having three levels would be disadvantageous, while an RC delay is not so important. Therefore, a two-level gate signal is used during the sensing mode.

Figure 7:
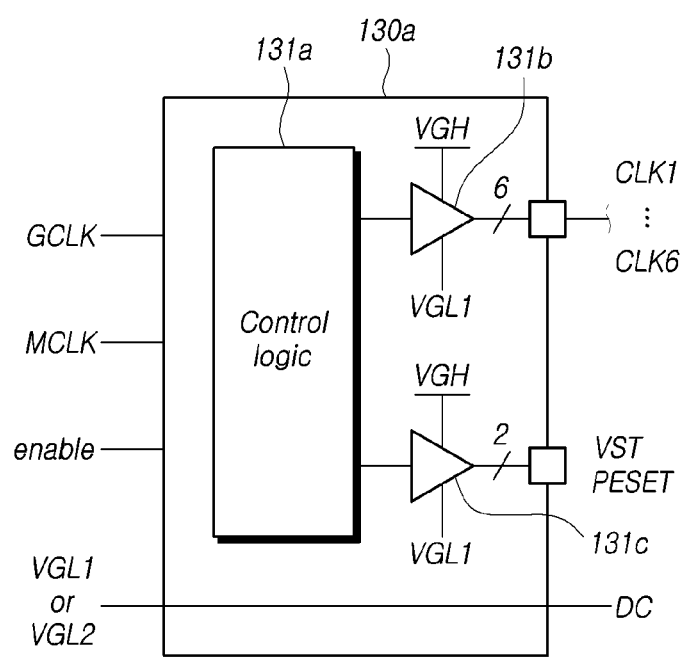
FIG. 7 is a diagram illustrating the level shifter illustrated in FIG. 3 according to the present disclosure.

FIG. 7 is a diagram illustrating the level shifter illustrated in FIG. 3 according to the present disclosure.

Referring to FIG. 7, the level shifter 130a can include a control logic 131a, a clock signal generator 131b, and a control signal generator 131c. The control logic 131a can receive a first clock GCLK and a second clock MCLK, and control the operations of the clock signal generator 131b and the control signal generator 131c. The clock signal generator 131b can output a high voltage VGH and a first low voltage VGL1 to a plurality of clock signals (CLK1, . . . , CLK6) according to the controlling of the control logic 131a. Six clock signals (CLK1, . . . , CLK6) outputted from the clock signal generator 131b is illustrated in FIG. 7, but aspects of the present disclosure are not limited thereto and any number of clock signals are possible. The control signal generator 131c can output a control signal VST or RESET for controlling the gate signal generating circuit 130b. By the control signal VST or RESET outputted from the control signal generator 131c, the gate signal generating circuit 130b can output a gate signal (gate) in the first mode and a gate signal (gate) in the second mode, using the clock signal (CLK1, . . . , CLK6) and the direct current (DC) signal.

Furthermore, the level shifter 130a can receive one of the first low voltage VGL1 or the second low voltage VGL2 and output the direct current (DC) signal corresponding to the received first low voltage VGL1 or second low voltage VGL2.

Figure 8:
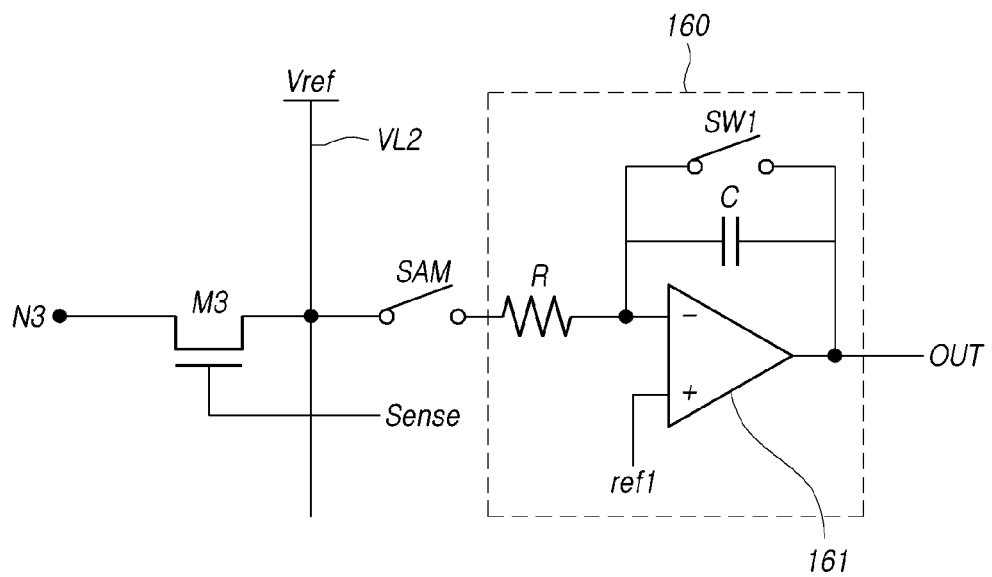
FIG. 8 is a circuit diagram illustrating a current sensor connected to the subpixel illustrated in FIG. 2 according to the present disclosure.

FIG. 8 is a circuit diagram illustrating a current sensor connected to one of the subpixels of the display panel 110, which may have the configuration as illustrated in FIG. 2, according to the present disclosure.

Referring to FIG. 8, the current sensor 160 can include an integrator. The integrator 160 can include an amplifier 161, a capacitor C, a switch SW1, a resistor R, and the like. The (−) terminal and the (+) terminal of the amplifier 161 can be connected to the resistor R and a reference signal ref1, respectively. A sampling switch SAM can be connected to the second electrode of the third transistor M3 of the subpixel 101. In the first mode, the third transistor M3 may be turned on by a sensing control signal (Sense). Current may flow from the third node N3 to the second power supply line VL2 through the third transistor M3; therefore, a voltage is formed in the second power supply line VL2. The sampling switch (SAM) may be connected to the second power supply line VL2. When a certain time has elapsed, the sampling switch (SAM) becomes turned on.

When the sampling switch (SAM) becomes turned on, current flows through the current sensor 160, and the characteristic value of the subpixel 101 can be sensed depending on a magnitude of the current. The capacitor C may be reset by the switch SW1. The capacitor C is operated in the first mode; therefore, it is much affected by a noise in the first mode. Accordingly, in order for the capacitor C not to be affected by the noise, the gate signal may have the waveform in FIG. 5B.

Figure 9:
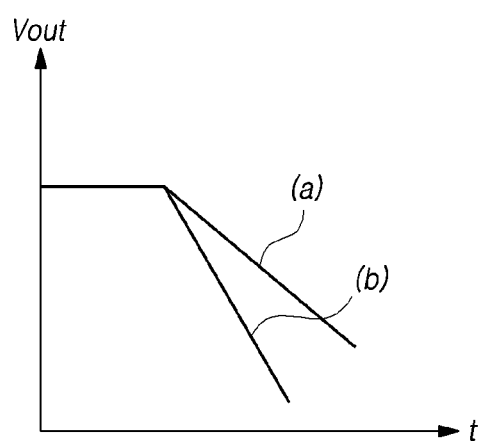
FIG. 9 illustrates a current sensed from the current sensor illustrated in FIG. 8 according to the present disclosure.

Further, a voltage outputted by the current sensor 160 may decrease according to the current inputted to the current sensor 160, as shown in FIG. 9. Here, when an amount of current is small, a rate at which the voltage decreases is slow as in (a) of FIG. 9, while the rate is fast as in (b) when the amount of current is large. Using this relationship, it is possible to obtain information on the characteristic value of the subpixel 101.

The current sensor 160 may be incorporated partially within the data driver 120. However, aspects of the present disclosure are not limited thereto, and other configurations are possible.

Figure 10:
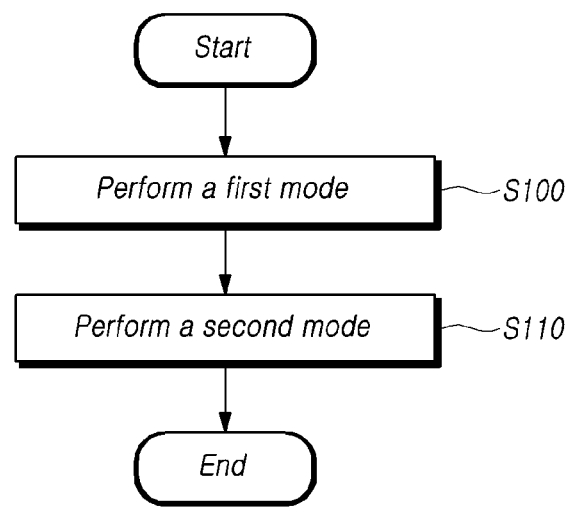
FIG. 10 is a flow diagram illustrating a method of driving the organic light emitting display device according to the present disclosure.

FIG. 10 is a flow diagram illustrating a method of driving the organic light emitting display device according to the present disclosure.

Referring to FIG. 10, a method of driving the organic light emitting display device can include supplying a sensing voltage to the subpixel in response to a gate signal in a first mode, at step S100. In the first mode, the method can further include receiving a pulse signal or clock signal with a voltage level between a high voltage and a first low voltage, and a direct current (DC) signal corresponding to a voltage level of a second low voltage, and outputting a gate signal.

The method can include outputting a data voltage to the subpixel in response to the gate signal in a second mode, at step S110. In the second mode, the method can further include receiving the clock signal with the voltage level between the high voltage and the first low voltage, and a direct current (DC) signal corresponding to a voltage level of the first low voltage, and outputting a gate signal.

The first mode may be a time where the organic light emitting display device starts its operation. That is, when a user starts to use the organic light emitting display device, the first mode is first performed, and then the second mode is performed and continues until the using of the organic light emitting display device by the user is completed. In other words, a data signal is revised according to the characteristic value of the subpixel that is sensed in the first mode, and then the second mode is performed based on the revised data signal. In the first mode, characteristics of the first transistor can be sensed, such as electron mobility and a threshold voltage of the first transistor. However, aspects of the present disclosure are not limited thereto and other characteristic values can be sensed.

Additionally or alternatively, the first mode may be performed for each frame in images including a plurality of frames. When one frame is started, before a data signal is applied, the first mode can be performed, and a characteristic value of a subpixel can be sensed by a sensing signal. Thereafter, a data signal corresponding to the frame can be inputted, resulting in the second mode being performed. Accordingly, the first mode and the second mode can be repeated alternately. The data signal can be revised according to a characteristic value of a subpixel for each frame, before applying the same to the subpixel. Thus, in the first mode, electron mobility and a threshold voltage of the first transistor can be sensed. However, aspects of the present disclosure are not limited thereto, and different characteristic values can be sensed.

The features, structures, configurations, and effects described in the present disclosure are included in at least one aspect but are not necessarily limited to a particular aspect. A person skilled in the art can apply the features, structures, configurations, and effects illustrated in the particular aspect aspects to one or more other additional aspect aspects by combining or modifying such features, structures, configurations, and effects. It should be understood that all such combinations and modifications are included within the scope of the present disclosure. Although the exemplary aspects have been described for illustrative purposes, a person skilled in the art will appreciate that various modifications and applications are possible without departing from the essential characteristics of the present disclosure. For example, the specific components of the exemplary aspects may be variously modified. The scope of protection of the present disclosure should be construed based on the following claims, and all technical ideas within the scope of equivalents thereof should be construed as being included within the scope of the present disclosure.

What is claimed is:

1. A gate driver for an organic light emitting display device comprising:
    a selector configured to select and output one of a first low voltage and a second low voltage in response to a mode selection signal, wherein the first low voltage is selected in a first mode and the second low voltage is selected in a second mode, and the second low voltage has a lower level than the first low voltage, and
    a level shifter configured to generate a clock signal based on a high voltage and the first low voltage, to output the clock signal at a first output terminal, and to generate a direct current signal corresponding to the first or second low voltage outputted from the selector and to output the direct current signal at a second output terminal,
    wherein the high voltage is a voltage level higher than the first low voltage and the clock signal is a voltage level between the high voltage and the first low voltage.

2. The gate driver according to claim 1, further comprising a gate signal generating circuit connected to the level shifter to receive the clock signal and the direct current signal and configured to output a gate signal such that in the first mode, a voltage level of the gate signal repeatedly alternates between the high voltage and the first low voltage, and in the second mode.

3. The gate driver according to claim 2, wherein the voltage level of the gate signal is repeatedly changed in the order of the high voltage, the second low voltage, and the first low voltage.

4. The gate driver according to claim 2, wherein the level shifter further comprises:
    a control logic;
    a clock signal generator controlled by the control logic and configured to generate and output the clock signal; and
    a control signal generator controlled by the control logic and configured to output a control signal for controlling the gate signal generating circuit.

5. The gate driver according to claim 1, further comprising a timing controller outputting a sensing signal in the first mode and outputting an image signal in the second mode,
wherein the mode selection signal is received from the timing controller.

6. An organic light emitting display device comprising:
a display panel including a plurality of data lines and a plurality of gate lines and a plurality of subpixels defined in areas in which the plurality of data lines and the plurality of gate lines intersect;
a data driver configured to apply at least one of a data signal and a sensing signal to the plurality of data lines;
a gate driver configured to apply a gate signal to the plurality of gate lines; and
a timing controller configured to control the data driver and the gate driver,
wherein the gate driver comprises:
a selector receiving a first low voltage and a second low voltage with a lower level than the first low voltage, and selecting and outputting one of the first low voltage and the second low voltage such that in response to a mode selection signal, the first low voltage is selected in a first mode and the second low voltage is selected in a second mode; and
a level shifter comprising a first output terminal receiving a high voltage and the first low voltage, and outputting a clock signal with a voltage level between the high voltage and the first low voltage, and a second output terminal outputting a direct current signal corresponding to the first low voltage or the second low voltage selected in the selector.

7. The organic light emitting display device according to claim 6, wherein the gate driver comprises a gate signal generating circuit receiving the clock signal and the direct current signal and outputting a gate signal such that in the first mode, a voltage level of the gate signal repeats the high voltage and the first low voltage, and in the second mode, the voltage level of the gate signal is changed in the order of the high voltage, the second low voltage, the first low voltage and the high voltage.

8. The organic light emitting display device according to claim 7, wherein the gate signal generating circuit is disposed on the display panel and connected to the plurality of gate lines.

9. The organic light emitting display device according to claim 7, wherein the level shifter further comprises:
a control logic;
a clock signal generator controlled by the control logic and outputting the clock signal using the high voltage and the first low voltage; and
a control signal generator controlled by the control logic and controlling the gate signal generating circuit.

10. The organic light emitting display device according to claim 7, wherein the first mode is a sensing mode and the second mode is a display mode and the first mode and the second mode are repeated alternately.

11. The organic light emitting display device according to claim 7, wherein the first mode is a sensing mode and the second mode is a display mode and the first mode is performed when the display panel starts to operate.

12. The organic light emitting display device according to claim 6, wherein the timing controller is configured to control the data driver to output at least one sensing voltage corresponding to the at least one sensing signal to at least one data line of the plurality of data lines, in the first mode, and to control the data driver to output at least one data voltage corresponding to the at least one data signal to the at least one data line, in the second mode.

13. The organic light emitting display device according to claim 12, wherein the current sensor includes an integrator comparing a sensing voltage generated by the current flowing through the third node with a pre-set reference voltage, and outputting the information according to the characteristic value of corresponding subpixel.

14. The organic light emitting display device according to claim 6, wherein each of the plurality of subpixels comprises:
a first transistor including a first electrode connected to a first node connected to a first power supply line for delivering a pixel high voltage, a gate electrode connected to a second node, and a second electrode connected to a third node;
a second transistor including a first electrode connected to one data line of the plurality of data lines, a gate electrode connected to one gate line of the plurality of gate lines, and a second electrode connected to the second node;
a third transistor including a first electrode connected to the third node, a gate electrode connected to a sensing signal line, and a second electrode connected to a second power supply line for delivering a reference voltage;
a capacitor connected between the first node and the third node; and
an organic light emitting diode including a first electrode connected to the third node and a second electrode connected to a pixel low voltage.

15. The organic light emitting display device according to claim 14, further comprising a current sensor connected to the second electrode of the third transistor and configured to sense a current flowing through the third node and output information according to a characteristic value of the corresponding subpixel.

16. A method for controlling a gate driver for an organic light emitting display device comprising:
receiving a first low voltage and a second low voltage with a lower level than the first low voltage and a high voltage with a higher level than the first low voltage and a mode selection signal;
selecting and outputting one of the first low voltage and the second low voltage in response to the mode selection signal, wherein the first low voltage is selected in a first mode and the second low voltage is selected in a second mode; and
outputting a clock signal with a voltage level between the high voltage and the first low voltage and a direct current signal corresponding to the selected one of the first and second low voltage.

17. The method according to claim 16, wherein the method further comprises:
providing a sensing voltage to a subpixel in response to a gate signal in the first mode; and
providing a data voltage to the subpixel in response to the gate signal in the second mode.

18. The method according to claim 17, wherein in the second mode, a voltage level of the gate signal is repeatedly changed in the order of the first low voltage, the high voltage, and the second low voltage, and in the first mode, the voltage level of the gate signal is repeatedly changed the first low voltage and the high voltage.

19. The method according to claim 17, wherein the direct current signal has a voltage level corresponding to the voltage level of the first low voltage in the first mode, and a voltage level corresponding to the voltage level of the second low voltage in the second mode.

20. The method according to claim 16, wherein the first mode is a sensing mode and the second mode is a display mode and the first mode and the first mode is performed when a display panel starts to operate.

\* \* \* \* \*